May 8, 1945.  R. C. WILSON  2,375,266
COMBINED SPOON AND LID FOR CONTAINERS
Filed Sept. 7, 1943
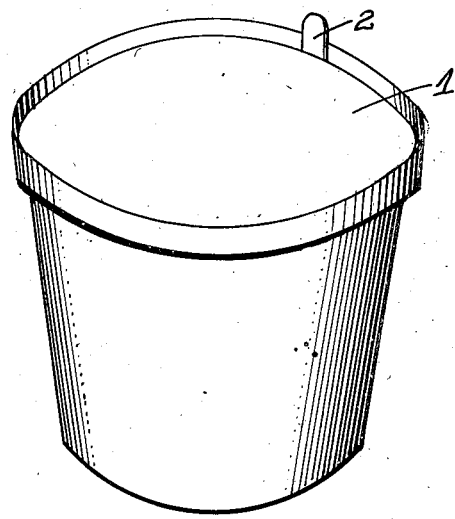
Fig. 1.
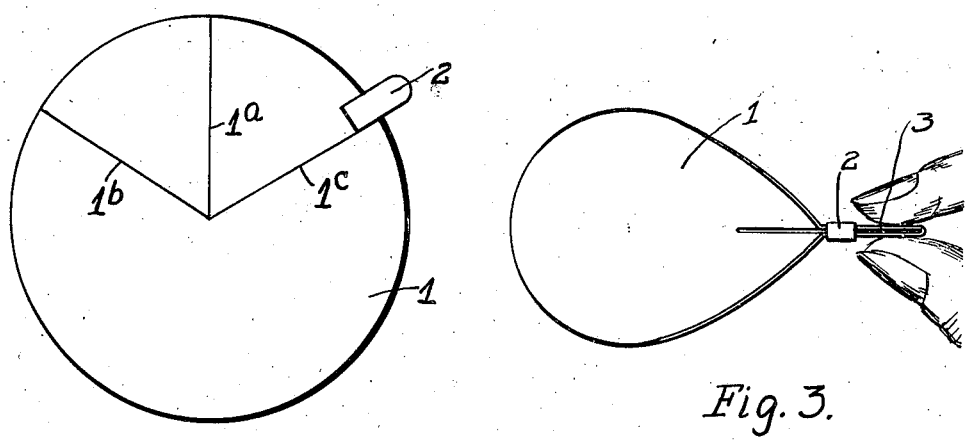
Fig. 2.
Fig. 3.
INVENTOR.
Robert C Wilson
BY
A.B.Bowman
Attorney Patented May 8, 1945

2,375,266

UNITED STATES PATENT OFFICE 2,375,266

COMBINED SPOON AND LID FOR CONTAINERS

Robert C. Wilson, Chula Vista, Calif., assignor of one-fourth to Richard W. Wilson, Chula Vista, Calif.

Application September 7, 1943, Serial No. 501,463

2 Claims. (Cl. 229—1.5)

My invention relates to a combined spoon and lid for containers such as containers for ice cream, cottage cheese, or the like and the objects of my invention are:

First, to provide a substantial lid to fit in the top of the container which may be quickly transformed into a spoon for removing the contents of the container and to facilitate eating said contents;

Second, to provide a combination lid and spoon of this class which when used as a lid is substantially the same as the conventional lid on containers of this class;

Third, to provide a lid of this class which may be quickly transformed into a substantial spoon for use in connection with the container;

Fourth, to provide a combined spoon and lid for containers of this class in which the spoon may be transformed back into a lid and used for a lid for the container if desired;

Fifth, to provide a combined spoon and lid of this class which when transformed into a spoon and used for the same is very strong and substantial for such use;

Sixth, to provide a combined spoon and lid for containers of this class which is applicable for use in connection with various types of containers now in use; and Seventh, to provide a combined spoon and lid for containers of this class which is very simple and economical of construction, easy to apply as a lid, easy to apply as a spoon, easy to transform from a lid to a spoon, easy to transform from a spoon to a lid.

With these and other objects in view as will appear hereinafter my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is an isometric view of a container with a lid positioned thereon ready for use; Fig. 2 is an upside down view of the lid alone and Fig. 3 is a top or plan view of the spoon which has been made from the lid.

Similar characters of reference refer to similar parts and portions throughout the several views of the drawing:

My combined spoon and lid for containers consists of a circular piece of paper 1 or any other suitable material which may be greased if desired to make it moisture proof. It is provided with a tab 2 which may be an integral extension of the member 1 or may be secured to the lower side as shown in Fig. 2 and made of stiffer material such as thin metal to provide a better clamp for holding the handle when transformed into a spoon as shown in Fig. 3. This member 3 is scored at its lower side with score marks 1a, 1b and 1c, to provide folding lines for forming the handle of the spoon.

The operation of my combined spoon and lid for containers is substantially as follows: When used as a lid the circular member 1 is positioned in the container with the tab extending upwardly at one side, as shown in Fig. 1 in conventional manner. The scored portions 1a, 1b and 1c are then on the lower side forming a substantial lid for the container. To transform it into a spoon, the lid is removed and one side is folded at the median line which is the score portion 1a, then it is folded so that the lines 1b and 1c are in opposed outer relation to each other and the extended portion of the tab 2 is folded over the two contacting portions of the handle, as shown in Fig. 3; the tab member holding the portions together to form the handle 3, which may be grasped by the finger and thumb, as shown in Fig. 3 and used as a spoon.

It is to be noted that the tab member 2 need not be folded over and the handle when folded together, as shown in Fig. 3, may be grasped by the thumb and finger closer up to the body portion of the spoon and held with the hand and used for temporary use only if desired.

Though I have shown and described a particular construction, combination and arrangement of parts and portions, I do not wish to be limited to this particular construction, combination and arrangement, but desire to include in the scope of my invention the construction, combination and arangement substantially as set forth in the appended claims.

Having thus described my invention, what I claim as new and desire to secure by Letters Patent is:

1. A combined spoon and lid for containers including a circular disc-like lid member provided with an extended tab portion and provided with three folding lines radiating from the center outwardly whereby said lid member may be formed into a spoon, said folding lines being so positioned on said lid member whereby the tab member may be folded over the two folded edge portions of said lid member when folded into spoon form for securing them together.

2. A combined spoon and lid for containers of the class described, consisting of a circular disc-like lid member provided with a tab extending from one side thereof and said lid provided with three scored folding lines radiating from the center outwardly to the edge, one of said scored folding lines being an intermediate line and the other two forming the intersection of the handle with the spoon portion when said lid is transformed into a spoon, said tab in position to be folded over the edges of the handle portion for securing said handle portions together adjacent the spoon portion.

ROBERT C. WILSON.